(12) United States Patent
Vajravel et al.

(10) Patent No.: US 11,038,968 B2
(45) Date of Patent: Jun. 15, 2021

(54) DEVICE AND MEDIA REDIRECTION TECHNIQUE FOR A BROWSER-BASED REMOTE DESKTOP CLIENT

(71) Applicant: Dell Products L.P., Round Rock, TX (US)

(72) Inventors: Gokul Thiruchengode Vajravel, Rayasandra Bengaluru (IN); Sandeep Ks, Idukki District (IN)

(73) Assignee: Dell Products L.P., Round Rock, TX (US)

( * ) Notice: Subject to any disclaimer, the term of this patent is extended or adjusted under 35 U.S.C. 154(b) by 201 days.

(21) Appl. No.: 16/057,676

(22) Filed: Aug. 7, 2018

(65) Prior Publication Data
US 2020/0053162 A1   Feb. 13, 2020

(51) Int. Cl.
  *G06F 15/16*   (2006.01)
  *H04L 29/08*   (2006.01)
  *H04L 29/12*   (2006.01)
  *H04L 29/06*   (2006.01)

(52) U.S. Cl.
  CPC ........ *H04L 67/141* (2013.01); *H04L 61/2007* (2013.01); *H04L 67/42* (2013.01)

(58) Field of Classification Search
  CPC .... H04L 61/2007; H04L 67/141; H04L 67/42
  USPC ........................................................ 709/203
  See application file for complete search history.

(56) References Cited

U.S. PATENT DOCUMENTS

| | | | |
|---|---|---|---|
| 8,010,630 B2* | 8/2011 | Barreto | H04L 29/08846 709/219 |
| 8,504,818 B2* | 8/2013 | Rao | H04L 63/08 713/150 |
| 8,739,252 B2* | 5/2014 | Kuang | H04L 63/08 726/4 |
| 9,137,224 B2* | 9/2015 | Kuang | H04L 63/06 |
| 9,473,581 B2* | 10/2016 | Gangadharan | H04L 67/141 |
| 9,961,112 B2* | 5/2018 | Hasson | H04L 63/102 |
| 9,973,511 B2* | 5/2018 | Ott | G06F 9/452 |
| 10,462,216 B1* | 10/2019 | Vysotsky | G06F 3/0481 |
| 10,545,625 B2* | 1/2020 | Page | G06T 11/60 |
| 10,587,713 B2* | 3/2020 | Rombakh | H04L 67/28 |
| 2012/0226742 A1* | 9/2012 | Momchilov | G06F 3/048 709/203 |
| 2014/0222894 A1* | 8/2014 | Gangadharan | H04L 67/02 709/203 |
| 2014/0372509 A1* | 12/2014 | Fausak | H04L 67/40 709/203 |

(Continued)

*Primary Examiner* — Moustafa M Meky
*Assistant Examiner* — Thorne E Waugh
(74) *Attorney, Agent, or Firm* — Kirton McConkie; Brian Tucker

(57) ABSTRACT

A device and media redirection technique is provided for a browser-based remote desktop client. A browser extension can be employed in conjunction with a browser-based remote desktop client to detect when the browser-based remote desktop client is attempting to establish a remote session. The browser extension can delay the establishment of the remote session until after the browser extension has registered to receive notifications pertaining to the remote session. Once the remote session is established, the browser extension will be notified and provided details of the remote session. The browser extension can then provide these details to the client-side proxy to enable the proxy to commence redirecting devices to or redirecting media from the remote session.

20 Claims, 12 Drawing Sheets

(56) References Cited

U.S. PATENT DOCUMENTS

| | | | |
|---|---|---|---|
| 2015/0120804 A1* | 4/2015 | Eschbach | H04L 67/2842 |
| | | | 709/203 |
| 2015/0341383 A1* | 11/2015 | Reddy | H04L 63/1466 |
| | | | 726/22 |
| 2016/0094539 A1* | 3/2016 | Suresh | H04L 67/40 |
| | | | 726/7 |
| 2018/0219849 A1* | 8/2018 | Jones | H04L 67/20 |
| 2018/0349283 A1* | 12/2018 | Bhatia | H04N 21/4782 |
| 2019/0386961 A1* | 12/2019 | Kupisiewicz | H04L 61/1511 |

* cited by examiner

US 11,038,968 B2

DEVICE AND MEDIA REDIRECTION TECHNIQUE FOR A BROWSER-BASED REMOTE DESKTOP CLIENT

CROSS-REFERENCE TO RELATED APPLICATIONS

N/A

BACKGROUND

The present invention is generally directed to redirection in a virtual desktop infrastructure (VDI) environment that employs browser-based (e.g., HTML5) remote desktop clients. This redirection includes redirecting a locally connected device to the server for access within a remote session and redirecting media from the server for rendering on the client.

USB device redirection generally refers to making a USB device that is connected to a client accessible within a virtual desktop as if the USB device had been physically connected to the virtual desktop. In other words, when USB device redirection is implemented, a user can connect a USB device to his or her client terminal and the USB device will function as if it had been connected to the server. Media redirection (e.g., Flash, multimedia, display, sound, etc.) generally refers to causing the media to be rendered on the client rather than on the server.

FIGS. 1 and 2 and the following description will provide a general overview of how USB device redirection can be implemented in accordance with some embodiments of the present invention. In FIG. 1, a computing system 100 is depicted as including a number of client terminals 102a-102n (referenced generally herein as client(s) 102) in communication with a server 104 via a network 106. Server 104 can be configured to support a remote session (e.g., a remote desktop session) wherein a user at a client 102 can remotely access applications and data at the server 104 from the client 102. Such a connection may be established using any of several well-known techniques such as the Remote Desktop Protocol (RDP) and the Citrix® Independent Computing Architecture (ICA).

Client terminal 102 may represent a computer, a mobile phone (e.g., smart phone), a laptop computer, a thin client terminal, a personal digital assistant (PDA), a portable computing terminal, or a suitable terminal or device with a processor. Server 104 may represent a computer, a laptop computer, a computing terminal, a virtual machine (e.g., VMware® Virtual Machine), a desktop session (e.g., Microsoft Terminal Server), a published application (e.g., Microsoft Terminal Server) or a suitable terminal with a processor.

Client 102 may initiate a remote session with server 104 by sending a request for remote access and credentials (e.g., login name and password) to server 104. If server 104 accepts the credentials from client 102, then server 104 may establish a remote session, which allows a user at client 102 to access applications and data at server 104. During the remote session, server 104 sends display data to client 102 over network 106, which may include display data of a desktop and/or one or more applications running on server 104. The desktop may include, for example, icons corresponding to different applications that can be launched on server 104. The display data allows client 102 to locally display the desktop and/or applications running on server 104.

During the remote session, client 102 may send user commands (e.g., inputted via a mouse or keyboard at client 102) to server 104 over network 106. Server 104 may process the user commands from client 102 similar to user commands received from an input device that is local to server 104. For example, if the user commands include mouse movements, then server 104 may move a pointer on the desktop running on server 104 accordingly. When the display data of the desktop and/or application changes in response to the user commands, server 104 sends the updated display data to client 102. Client 102 locally displays the updated display data so that the user at client 102 can view changes at server 104 in response to the user commands. Together, these aspects allow the user at client 102 to locally view and input commands to the desktop and/or application that is running remotely on server 104. From the perspective of the client, the desktop running on server 104 may represent a virtual desktop environment.

FIG. 2 is a block diagram of a VDI environment 200 in accordance with embodiments of the present invention. VDI environment 200 may include client 102 in communication with server 104 over network 106 as illustrated in FIG. 1. Client 102 includes a remote desktop client 200a which includes the various components necessary for establishing a remote session on server 104. To enable USB device redirection, remote desktop client 200a includes a proxy 210, a stub driver 220, and a bus driver 230. Client 102 can be connected to a device 240, as shown in FIG. 2. Server 104 may include an agent 250 and a virtual bus driver 260. Proxy 210 and agent 250 are typically configured to communicate over a virtual channel.

In accordance with USB device redirection techniques, while device 240 is not locally or physically connected to server 104 and is remote to server 104, device 240 appears to server 104 as if it is locally connected to server 104, as discussed further below. Thus, device 240 appears to server 104 as a virtual device 290.

By way of illustration and not limitation, device 240 may be any type of USB device including a machine-readable storage medium (e.g., flash storage device), a printer, a scanner, a camera, a facsimile machine, a phone, an audio device (e.g., a headset), a video device (e.g., a camera), a peripheral device, or other suitable device that can be connected to client 102. Device 240 may be an external device (i.e., external to client 102) or an internal device (i.e., internal to client 102). For purposes of this application, device 240 can represent an authentication device such as a smart card.

Bus driver 230 can be configured to allow the operating system and programs of client 102 to interact with device 240. In one aspect, when device 240 is connected to client 102 (e.g., plugged into a port of client 102), bus driver 230 may detect the presence of device 240 and read information regarding device 240 ("device information") from device 240. The device information may include features, characteristics and other information specific to device 240 such as a device descriptor (e.g., product ID, vendor ID and/or other information), a configuration descriptor, an interface descriptor, an endpoint descriptor and/or a string descriptor. Bus driver 230 may communicate with device 240 through a computer bus or other wired or wireless communications interface.

In accordance with USB device redirection techniques, device 240 may be accessed from server 104 as if the device were connected locally to server 240. Device 240 may be accessed from server 104 when client 102 is connected to server 104 through a remote session running on server 104.

For example, device 240 may be accessible from the desktop running on server 104 (i.e., virtual desktop environment). To enable this, bus driver 230 may be configured to load stub driver 220 as the default driver for device 240. Stub driver 220 may be configured to report the presence of device 240 to proxy 210 and to provide the device information (e.g., device descriptor) to proxy 210. Proxy 210 may be configured to report the presence of device 240, along with the device information, to agent 250 of server 104 over network 106 (e.g., via a TCP or UDP socket). Thus, stub driver 220 redirects device 240 to server 104 via proxy 210.

Agent 250 may be configured to receive the report from proxy 210 that device 240 is connected to client 102 and the device information. Agent 250 may further be configured to associate with the report from proxy 210 one or more identifiers for client 102 and/or for a remote session through which client 102 is connected to server 104, such as a session number or a session locally unique identifier (LUID). Agent 250 can provide notification of device 240, along with the device information, to virtual bus driver 260. Virtual bus driver 260 (which may be a Dell Wyse TCX USB bus driver, or any other bus driver) may be configured to create and store in memory a record corresponding to device 240. This record may include at least part of the device information and session identifiers received from agent 250. Virtual bus driver 260 may be configured to report to operating system 170 of server 104 that device 240 is connected and to provide the device information to the operating system. This allows the operating system of server 104 to recognize the presence of device 240 even though device 240 is connected to client 102.

The operating system of server 104 may use the device information to find and load one or more appropriate device drivers for device 240 at server 104. Each driver may have an associated device object (object(s) 281*a*, 281*b*, . . . , 281*n*, referred to generally as device object(s) 281), as illustratively shown in FIG. 2. A device object 281 is a software implementation of a real device 240 or a virtualized (or conceptual) device 290. Different device objects 281 layer over each other to provide the complete functionality. The different device objects 281 are associated with different device drivers (driver(s) 282*a*, 282*b*, . . . 282*n*, referred to generally as device driver(s) 282). In an example, a device 240 such as a USB flash drive may have associated device objects including objects corresponding to a USB driver, a storage driver, a volume manager driver, and a file system driver for the device. The device objects 281 corresponding to a same device 240 form a layered device stack 280 for device 240. For example, for a USB device, a USB bus driver will create a device object 281*a* stating that a new device has been plugged in. Next, a plug-and-play (PNP) component of the operating system will search for and load the best driver for device 240, which will create another device object 281*b* that is layered over the previous device object 281*a*. The layering of device objects 281 will create device stack 280.

Device objects 281 may be stored in a memory of the server 104 associated with virtual bus driver 260. In particular, device objects 281 and resulting device stack 280 may be stored in random-access memory of server 104. Different devices 240/290 can have device stacks having different device objects and different numbers of device objects. The device stack may be ordered, such that lower level device objects (corresponding to lower level device drivers) have lower numbers than higher level device objects (corresponding to higher level device drivers). The device stack may be traversed downwards by traversing the stack from higher level objects to lower level objects. For example, in the case of an illustrative device stack 280 corresponding to a USB flash drive, the ordered device stack may be traversed downwards from a high-level file system driver device object, to a volume manager driver device object, to a storage driver device object, to a USB driver device object, and finally to a low-level virtual bus driver device object. Different device stacks 280 can be layered over each other to provide the functionality of the devices 240/290 inside devices, like USB Headsets, or USB pen drives. A USB pen drive, for example, can create a USB device stack first, over which it can create a storage device stack, where each of the device stacks have two or more device objects.

Once one or more device object(s) 281 are loaded by operating system 170 of server 104, each device object 281 can create a symbolic link (also referred to as a "device interface") to device object 281 and associated device driver 282. The symbolic link is used by applications running on server 104 to access device object 281 and device 240/290. The symbolic link can be created by a call to a function such as IoCreateSymbolicLink( ) including such arguments as a name for the symbolic link, and a name of device object 281 or associated device 240. In one example, for example, a symbolic link to a USB flash drive device 240 is created by a call from a device object 281 for device 240 to the function IoCreateSymbolicLink( ) including arguments "\\GLOBAL??\C:" (i.e., the name for the symbolic link) and "\Device\HarddiskVolume1" (i.e., a name of the device object).

The creation of a symbolic link results in an entry being created in an object manager namespace (OMN) of operating system 170. The OMN stores information on symbolic links created for and used by operating system 170, including symbolic links for devices 240, virtualized devices 290, and applications 270 running on server 104.

As a result of the symbolic link creation process, a symbolic link to device 240 is enumerated in the OMN of server 104. Once the presence of device 240 is reported to operating system 170 of server 104, device 240 may be accessible from a remote session (and associated desktop) running on server 104 (i.e., virtual desktop environment). For example, device 240 may appear as an icon on the virtual desktop environment and/or may be accessed by applications running on server 104.

An application 270 running on server 104 may access device 240 by sending a transaction request including the symbolic link for device 240 to operating system 170. Operating system 170 may consult the Object Manager Namespace to retrieve an address or other identifier for the device itself 240 or for a device object 281 associated with device 240. Using the retrieved address or identifier, operating system 170 forwards the transaction request for device 240 either directly, through a device object 281 of device stack 280, and/or through virtual bus driver 260. Virtual bus driver 260 may direct the transaction request to agent 250, which sends the transaction request to proxy 210 over network 106. Proxy 210 receives the transaction request from agent 250, and directs the received transaction request to stub driver 220. Stub driver 220 then directs the transaction request to device 240 through bus driver 230.

Bus driver 230 receives the result of the transaction request from device 240 and sends the result of the transaction request to stub driver 220. Stub driver 220 directs the result of the transaction request to proxy 210, which sends the result of the transaction request to agent 250 over network 106. Agent 250 directs the result of the transaction request to virtual bus driver 260. Virtual bus driver 260 then directs the result of the transaction request to application 270 either directly or through a device object 281 of device stack 280.

Thus, virtual bus driver 260 may receive transaction requests for device 240 from application 270 and send results of the transaction requests back to application 270 (either directly or through a device object 281 of device stack 280). As such, application 270 may interact with virtual bus driver 260 in the same way as with a bus driver for a device that is connected locally to server 104. Virtual bus driver 260 may hide the fact that it sends transaction requests to agent 250 and receives the results of the transaction requests from agent 250 instead of a device that is connected locally to server 104. As a result, device 240 connected to client 102 may appear to application 270 as if the physical device 240 is connected locally to server 104.

With media redirection, the server-side components (e.g., Microsoft's Remote Desktop Services that would be part of operating system 170) will forego rendering and instead send the unrendered media to the client terminal for rendering. FIG. 3 illustrates how this media redirection would be performed in VDI environment 200. As shown, proxy 210, which would include an endpoint for each virtual channel employed to redirect media, can receive communications from the component of operating system 170 tasked with redirecting the particular media content. When proxy 210 receives unrendered media, it will render it on client 102 in a suitable manner. In this way, the load of rendering the media is shifted from the server to the client. Additionally, because it prevents rendered content from being transmitted over the network, media redirection greatly reduces the load on the network.

In FIGS. 2 and 3, remote desktop client 200a is executed natively on client 102 and therefore has full access to the components necessary for implementing device and media redirection. However, many remote desktop clients are now being implemented as browser-based (e.g., HTML5) remote desktop clients. In such cases, the users will employ the browser to access remote desktops and applications.

Because browsers are relatively unsecure, and because virtual channels provide a point of exploitation, protocol vendors do not support virtual channels in browser-based remote desktop clients. Browsers also limit access to the components necessary for performing redirection (e.g., the USB device stack). Therefore, browser-based remote desktop clients cannot implement device and media redirection—at least without significant modifications to the VDI environment.

FIG. 4 illustrates an example of a VDI environment 400 in which browser-based remote desktop clients are employed. As shown, server 104 remains generally the same as in VDI environment 200 in that it uses a remote display protocol (e.g., RDP) to communicate. However, because the remote desktop client on client 102 is in the form of a browser-based remote desktop client 450 that executes within browser 150, it will be limited to using the Web Socket protocol (or possibly HTTP) to communicate. Therefore, VDI environment 400 will also include a gateway 410 (which could be a stand-alone server or could be incorporated into server 104) that acts as an intermediary for converting the remote display protocol communications into Web Socket data and vice versa. More specifically, when operating system 170 sends remote display protocol communications with graphical display data, gateway 410 will convert the graphical display data into HTML5 content that can be rendered within browser 150 using HTML5 Canvas technology. The user's keyboard, mouse or touch input that interfaces with the rendered HTML5 content will then be sent back using standard HTML5 keyboard and mouse input events.

BRIEF SUMMARY

The present invention extends to methods, systems, and computer program products for implementing a device and media redirection technique for a browser-based remote desktop client. A browser extension can be employed in conjunction with a browser-based remote desktop client to detect when the browser-based remote desktop client is attempting to establish a remote session. The browser extension can delay the establishment of the remote session until after the browser extension has registered to receive notifications pertaining to the remote session. Once the remote session is established, the browser extension will be notified and provided details of the remote session. The browser extension can then provide these details to the client-side proxy to enable the proxy to commence redirecting devices to or redirecting media from the remote session.

In some embodiments, the present invention can be implemented by a browser extension as a method for performing redirection when a browser-based remote desktop client establishes a remote session. The browser extension can detect that a browser-based remote desktop client is attempting to establish a remote session for a user. Prior to the remote session being established, the browser extension can send a request to be notified of state changes in any remote session that the user establishes. In response to the remote session being establishes, the browser extension receives redirection information for the remote session. This redirection information can include a session identifier of the remote session. The browser extension can then send the redirection information to a proxy that is executing on the client to thereby enable the proxy to commence redirection in the remote session established by the browser-based remote desktop client.

In other embodiments, the present invention can be implemented as a method for performing redirection when a browser-based remote desktop client establishes a remote session. A browser extension on a client can detect that a user is attempting to establish a remote session on a server from a browser-based remote desktop client. The browser extension can delay the user's attempt until after the browser extension has registered to receive notifications of state changes in any remote session that the user establishes. The browser extension can register to receive notifications by obtaining a username of the user from the browser-based remote desktop client and sending the username of the user to a management server. The browser extension will then receive, from the management server, a notification that a remote session has been established for the user. This notification can include a session identifier of the remote session and an IP address of the server on which the remote session was established. The browser extension will then send the session identifier and the IP address of the server to a proxy that is executing on the client outside of the browser.

In other embodiments, the present invention can be implemented as a method for performing redirection when a browser-based remote desktop client establishes a remote session. A browser extension on a client detects that a browser-based remote desktop client is attempting to establish a remote session for a user on a server and obtains, from the browser-based remote desktop client, an identifier of the server and a username of the user. Prior to the remote session being established, the browser extension sends a request to be notified of state changes in any remote session that the user establishes. This request includes the identifier of the server, the username of the user and a client IP address at which the browser extension receives notifications. The browser extension then receives a notification that a remote session has been established for the user on the server. This notification includes a session identifier of the remote session and a server IP address. The browser extension sends the session identifier and the server IP address to a proxy that is executing on the client outside of the browser. The proxy then employs the session identifier and the server IP address to commence redirection of one or more of a device or media within the remote session.

This summary is provided to introduce a selection of concepts in a simplified form that are further described below in the Detailed Description. This Summary is not intended to identify key features or essential features of the claimed subject matter.

BRIEF DESCRIPTION OF THE DRAWINGS

Understanding that these drawings depict only typical embodiments of the invention and are not therefore to be considered limiting of its scope, the invention will be described and explained with additional specificity and detail through the use of the accompanying drawings in which.

DETAILED DESCRIPTION

In this specification and the claims, the term "browser-based remote desktop client" should be construed to encompass an HTML5 remote desktop client or any other remote desktop client that executes within a browser. Therefore, a remote desktop client that executes within a browser and that is based on a subsequent HTML standard should also be considered a browser-based remote desktop client.

The present invention provides a device and media redirection technique for a browser-based remote desktop client which leverages traditional redirection components. Device and media redirection can therefore be accomplished using the traditional components while also obtaining the benefits of architecture, operating system and browser independence that a browser-based remote desktop client provides.

Figure 1:
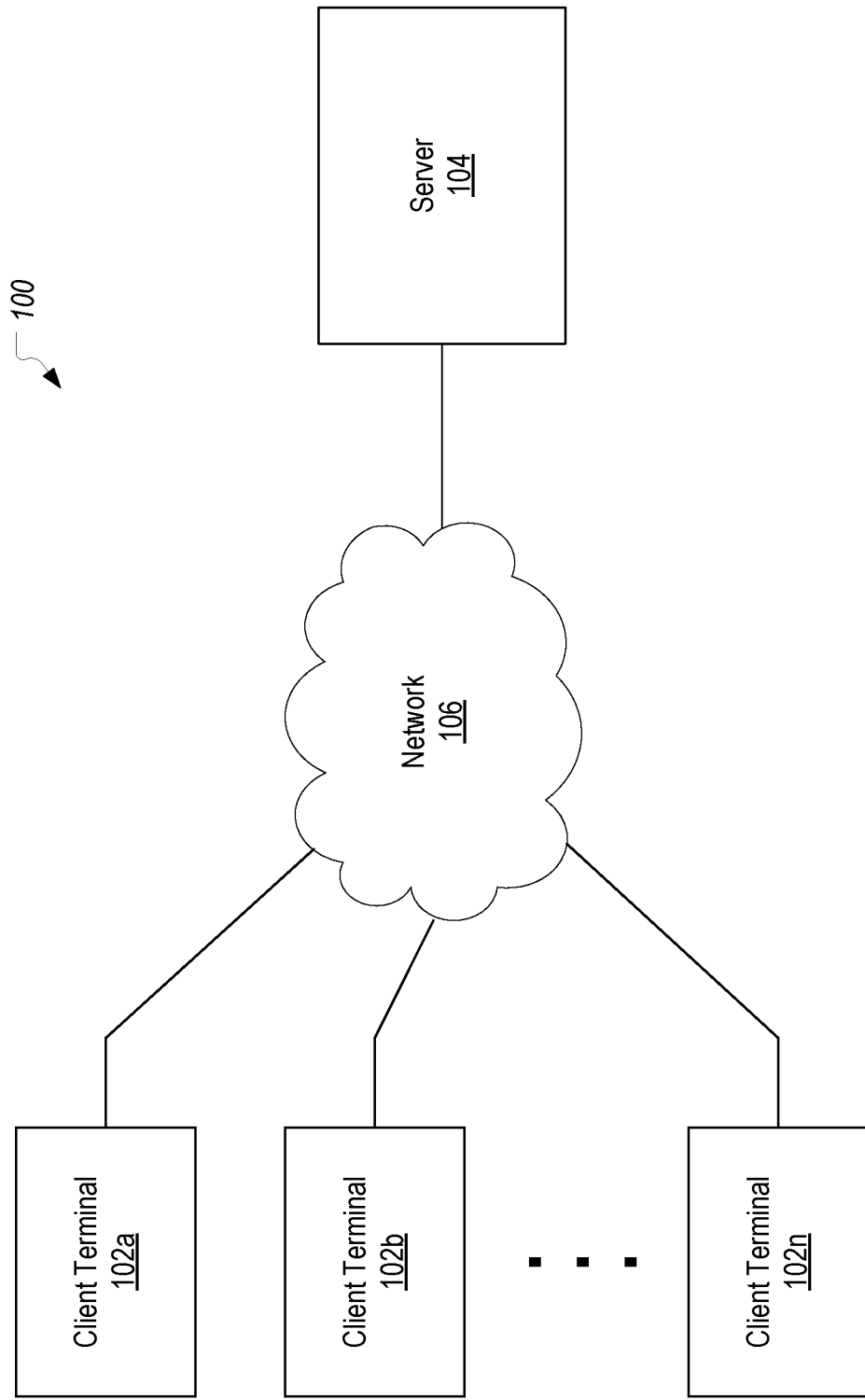
FIG. 1 illustrates an example computing environment in which the present invention can be implemented.
Figure 2:
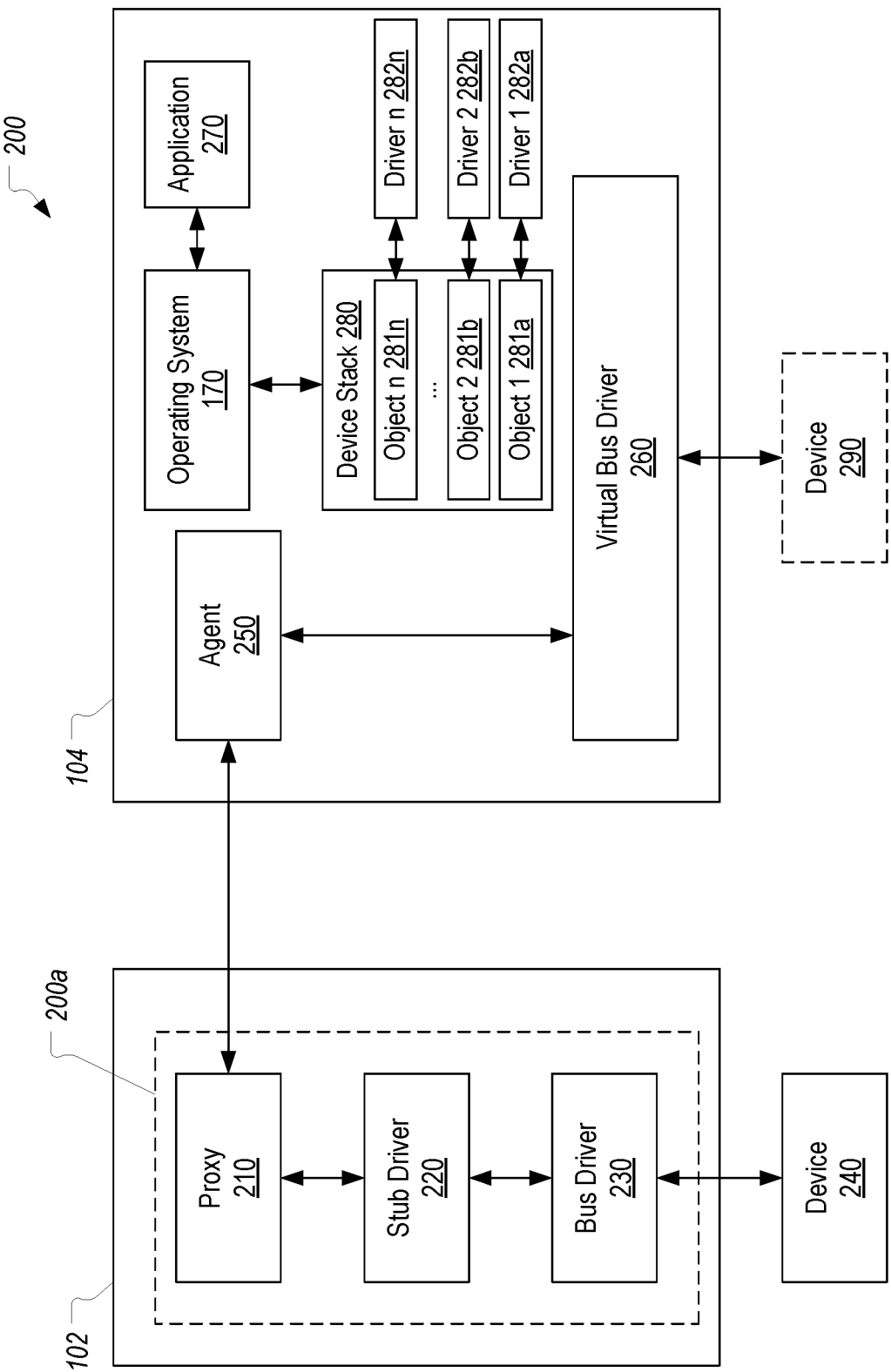
FIG. 2 illustrates how a USB device can be redirected from a client terminal to a server when the remote desktop client is executed natively.
Figure 3:
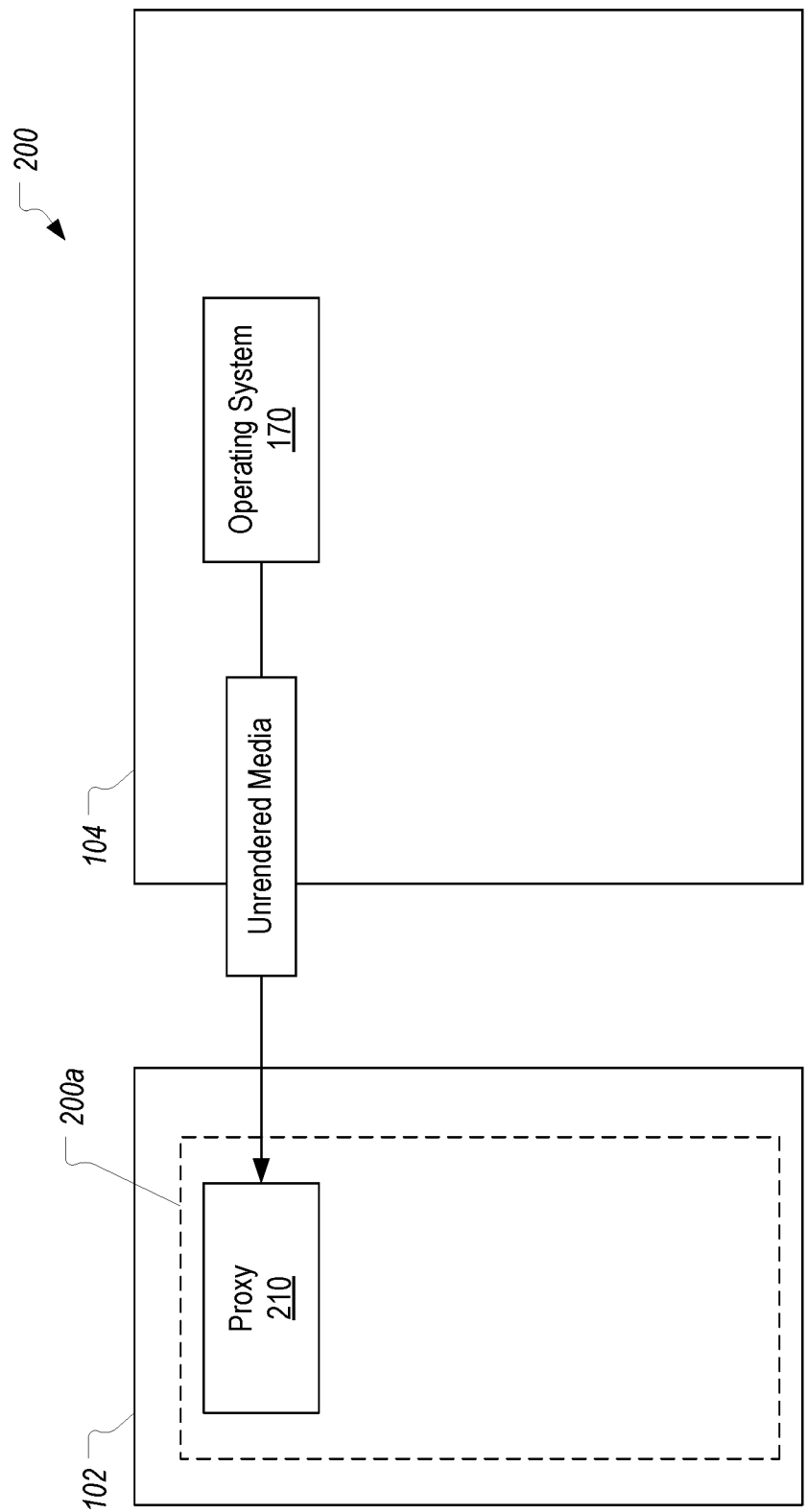
FIG. 3 illustrates how media can be redirected from the server to the client terminal when the remote desktop client is executed natively.
Figure 4:
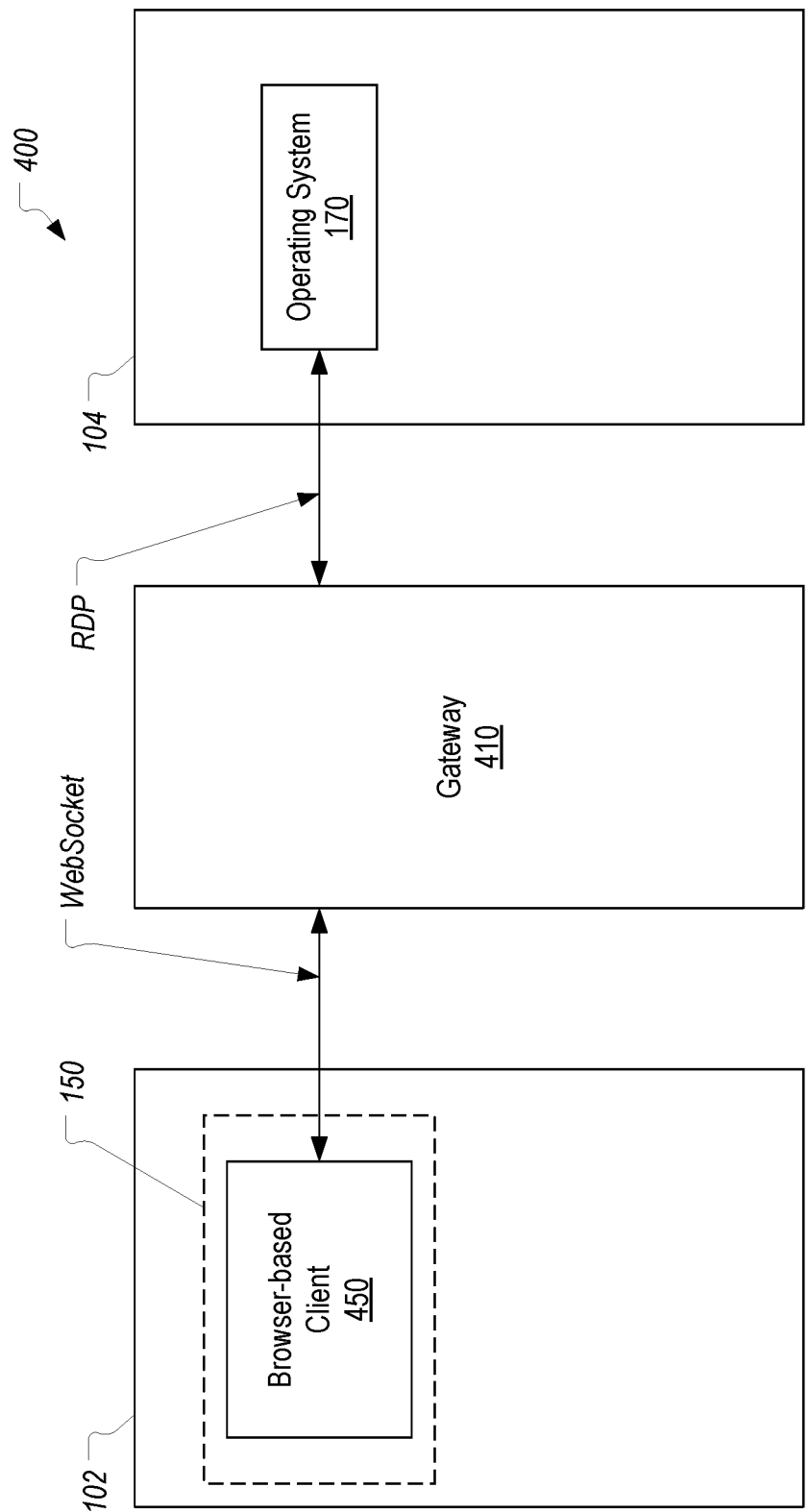
FIG. 4 illustrates a VDI environment in which the remote desktop client is browser-based and therefore unable to perform device and media redirection using virtual channels.
Figure 5:
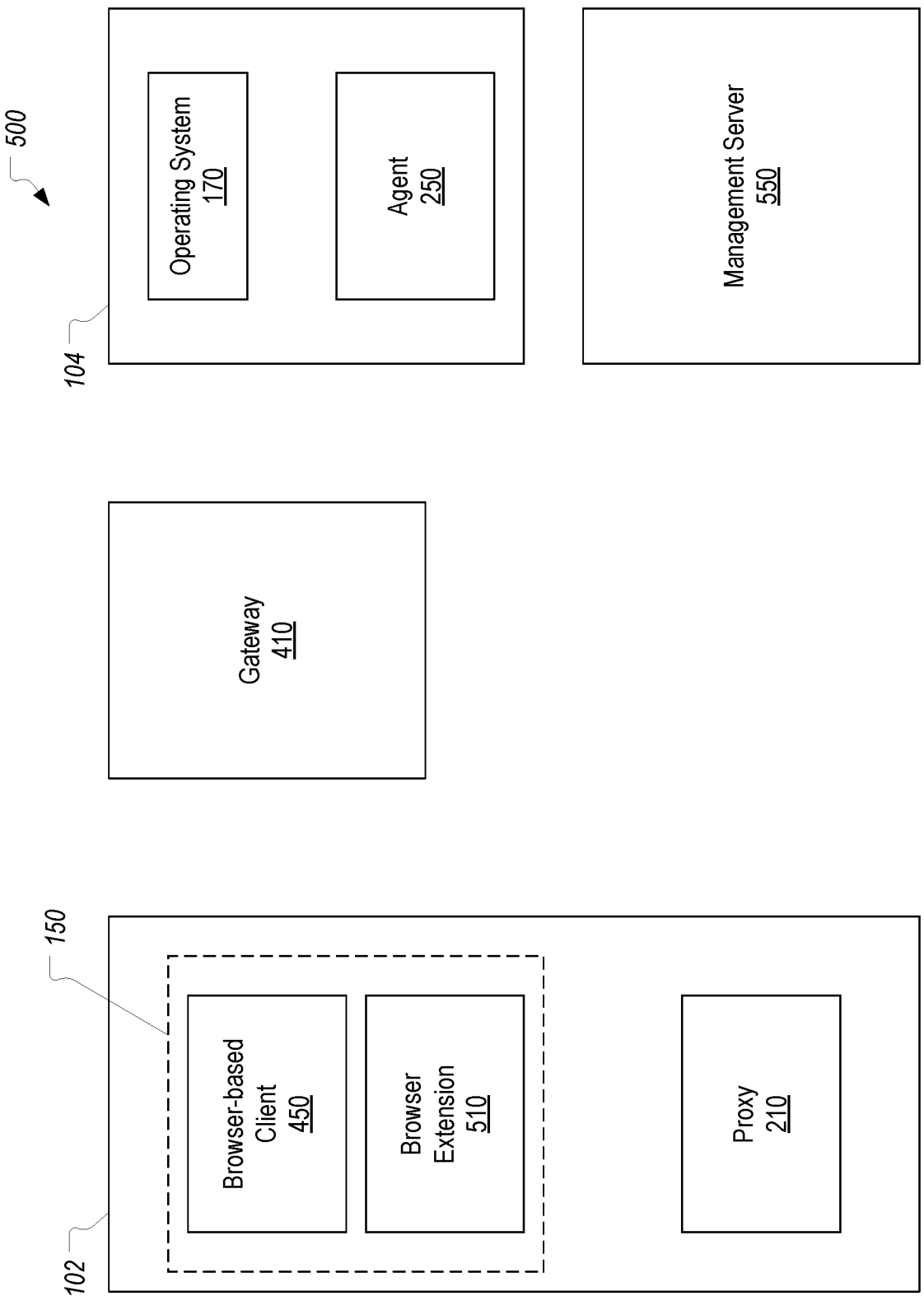
FIG. 5 illustrates a VDI environment that is configured in accordance with embodiments of the present invention.

FIG. 5 illustrates a VDI environment 500 that is configured in accordance with embodiments of the present invention. VDI environment 500 includes the same components as VDI environment 400 including browser-based remote desktop client 450, gateway 410 and server 104. Additionally, in VDI environment 500, client 102 includes proxy 210 and server 104 includes agent 250, both of which can function in a similar manner as described in the background to implement device and media redirection. VDI environment 500 can also include a management server 550 (e.g., the Wyse Management Suite) which is tasked with managing clients 102 and the remote sessions they create. It is noted that server 104 and management server 550 may oftentimes be separate virtual machines in a cloud environment, but any arrangement of physical or virtual machines could be employed.

As mentioned above, browser-based remote desktop client 450 will only be enabled to access functionality that browser 150 provides. Importantly, the functionality that proxy 210 performs to implement redirection cannot simply be incorporated into browser-based remote desktop client 450 because browser 150 does not enable the functionality. To address this issue, the present invention provides a browser extension 510 that, in general terms, links a remote session established by browser-based remote desktop client 450 with proxy 210 for the purpose of enabling proxy 210 to establish virtual channels within the remote session so that devices or media can be redirected.

Figure 6A:
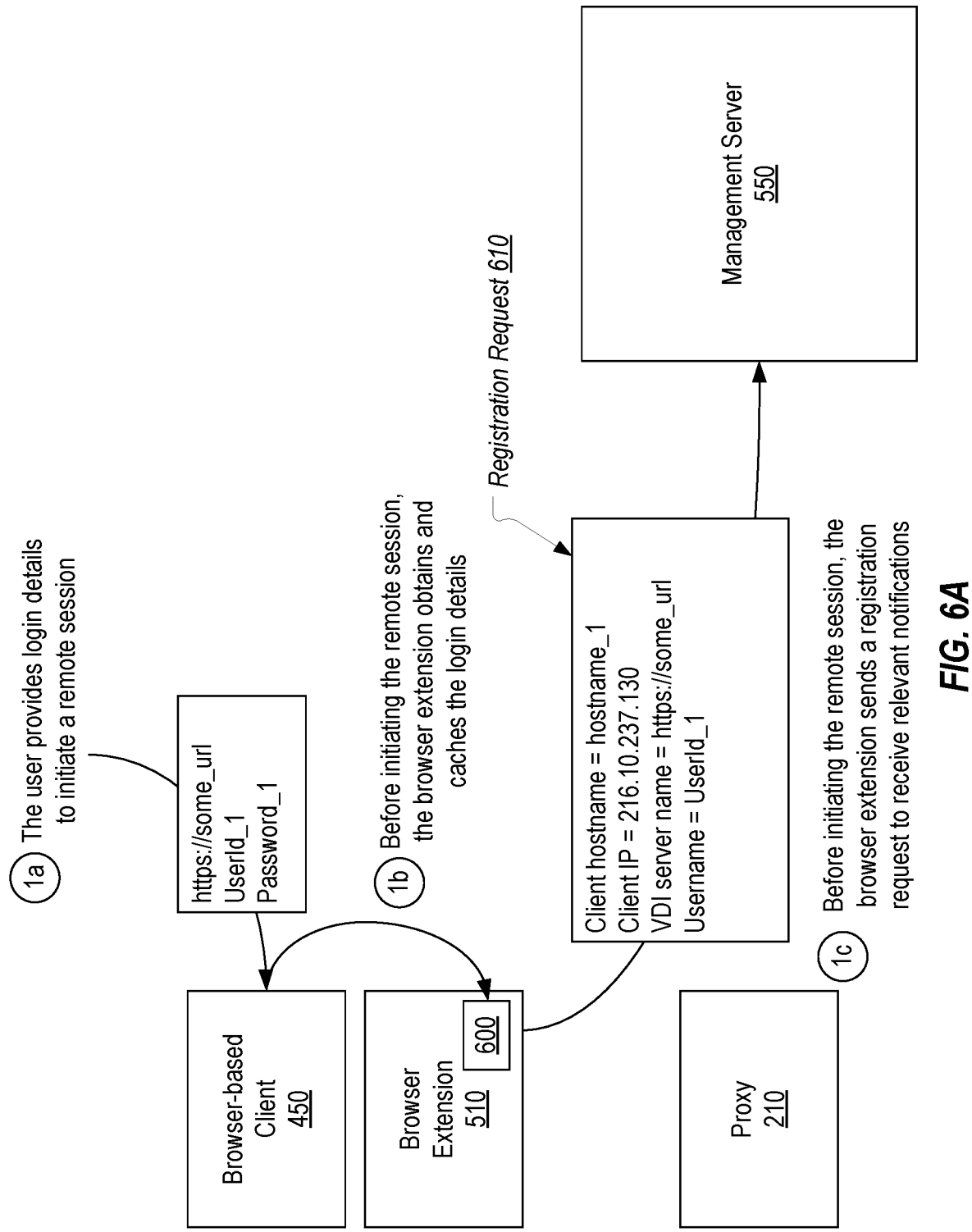
FIGS. 6A-6F illustrate how a browser extension can be employed to enable redirection in VDI environments that include a browser-based remote desktop client.

FIGS. 6A-6F illustrate how browser extension 510 enables redirection within VDI environment 500. In FIG. 6A, it will be assumed that the user has navigated his or her browser to cause a login screen of browser-based remote desktop client 450 to be displayed. Typically, this login screen will prompt the user to input a URL that identifies the VDI server, a username and a password (unless such information has already been stored). In this context, the VDI server could represent the connection manager, broker or other architecture that handles the login and establishment of a remote session. The login screen may also prompt the user for a domain name or other connection information that will be used to establish the requested remote session. Accordingly, step 1*a* represents that the user has provided input that identifies a URL of the VDI server (https://some_url), the user's username for logging in to remote sessions (UserId_1) and the user's password (Password_1).

In accordance with embodiments of the present invention, browser extension 510 can be configured to delay the submission of the login request momentarily. In particular, in step 1*b*, browser extension 510 is shown as obtaining and caching the login details 600 before browser-based remote desktop client 450 submits the user's request to the VDI server. Then, in step 1*c*, which is also performed prior to the submission of the user's request, browser extension 510 sends a registration request 610 to management server 550. Registration request 610 includes the VDI server name (https://some_url) and the username (UserId_1) as well as the hostname (hostname_1) and IP address (216.10.237.130) of client terminal 102. Registration request 610 functions as a request to be notified when changes in the state of a corresponding session occur. In this example therefore, registration request 610 constitutes a request that browser extension 510 be notified of changes in the state of a session that is established for the user having a username of UserID_1.

Figure 6B:
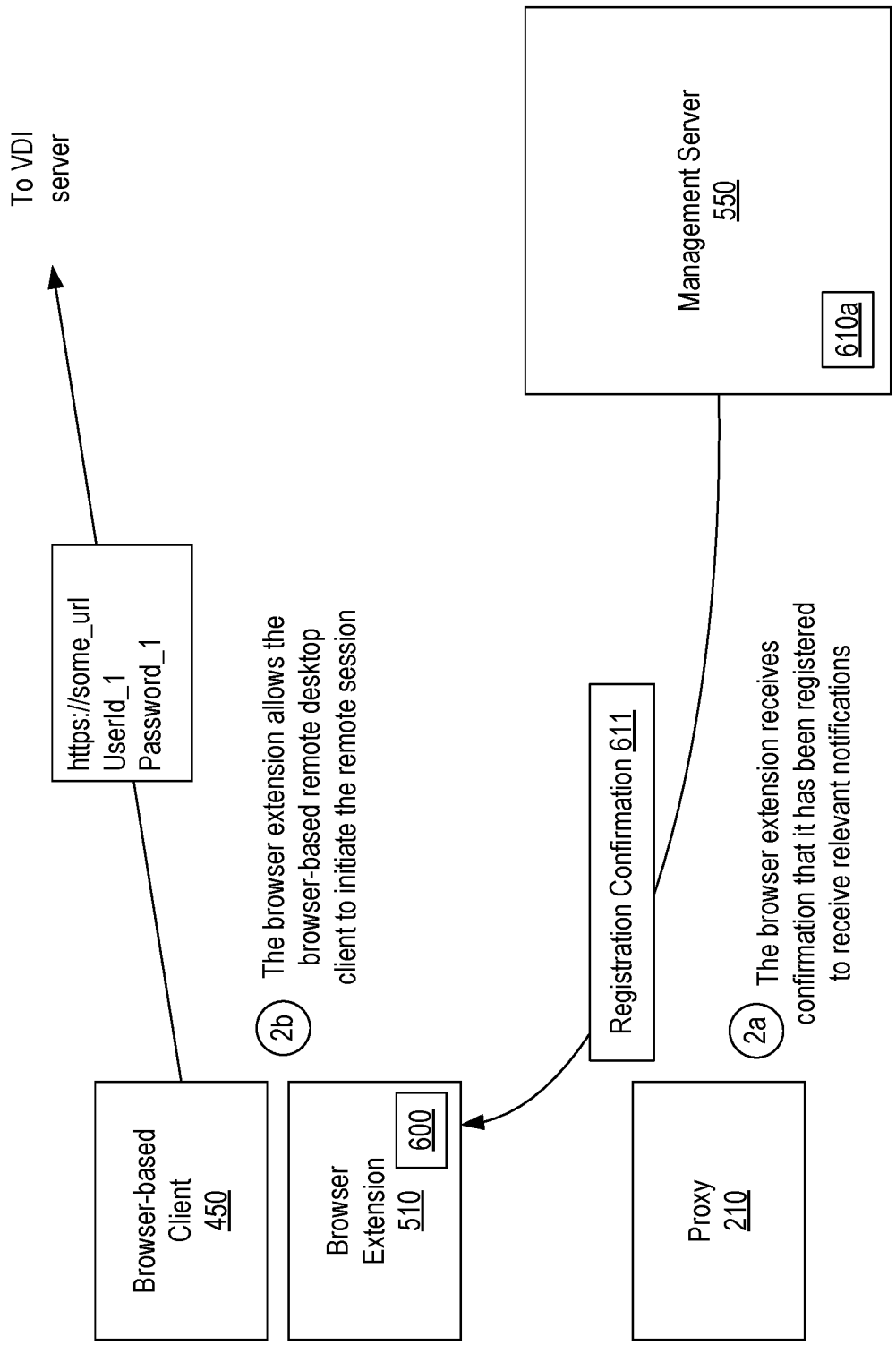

Turning to FIG. 6B, in step 2*a*, browser extension 510 will receive registration confirmation 611 from management server 550 which indicates that browser extension 510 has been successfully registered to receive notifications of state changes in any remote session that UserID_1 establishes. Management server 550 is shown as storing information 610*a* from registration request 610 to represent this successful registration. As will be described below, management server 550 uses information 610*a* to identify and communicate with browser extension 510 when state changes in UserID_1's session occur. Importantly, browser extension 510 prevents browser-based remote desktop client 450 from initiating the remote session until after browser extension 510 has successfully registered with management server 550. This is to ensure that browser extension 510 will be notified when the remote session is established. Accordingly, in step 2*b*, after receiving registration confirmation 611, browser extension 510 allows browser-based remote desktop client 450 to send the login details to the VDI server in order to establish a remote session.

Figure 6C:
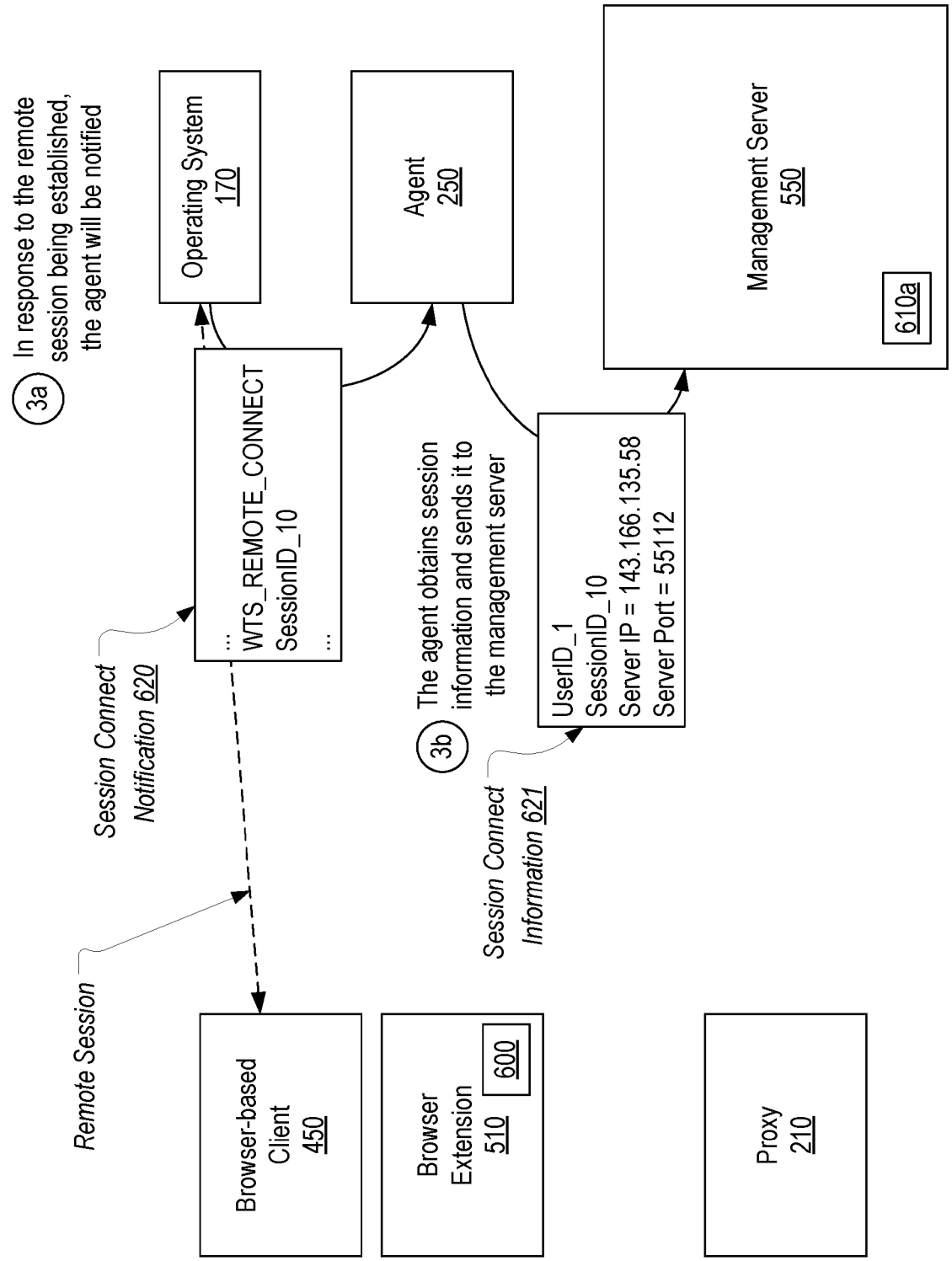

Turning to FIG. 6C, in response to step 2*b*, a remote session will be established on server 104 (which may typically be a virtual machine that may already have a number of active remote sessions). Server 104 will include an instance of agent 250 (or a similar agent such as a component of management server 550) that is configured to be notified whenever a session is connected on server 104. For example, in a Windows environment, agent 250 can register to be notified of such session change events by calling WTSRegisterSessionNotification and specifying the NOTIFY_FOR_ALL_SESSIONS flag. In such a case, and as represented by step 3*a*, when the remote session is established for UserID_1, operating system 170 will send agent 250 a session connect notification 620 which may be in the form of a WM_WTSSESSION_CHANGE message that specifies WTS_REMOTE_CONNECT (representing that a session was connected to a remote terminal) along with a session identifier that has been assigned to the connected session (which is assumed to be SessionID_10 in this example).

Using the session identifier specified in session connect notification 620, agent 250 can obtain the username associated with the session (e.g., by calling WTSQuerySessionInformation) and can also obtain the IP address (which is assumed to be 143.166.135.58) and port number (which is assumed to be 55112) of server 104. The IP address and port number are those that are necessary to allow proxy 210 to establish a virtual channel with agent 250 as will be described below. In step 3*b*, agent 250 can provide this session connect information 621 to management server 550.

Figure 6D:
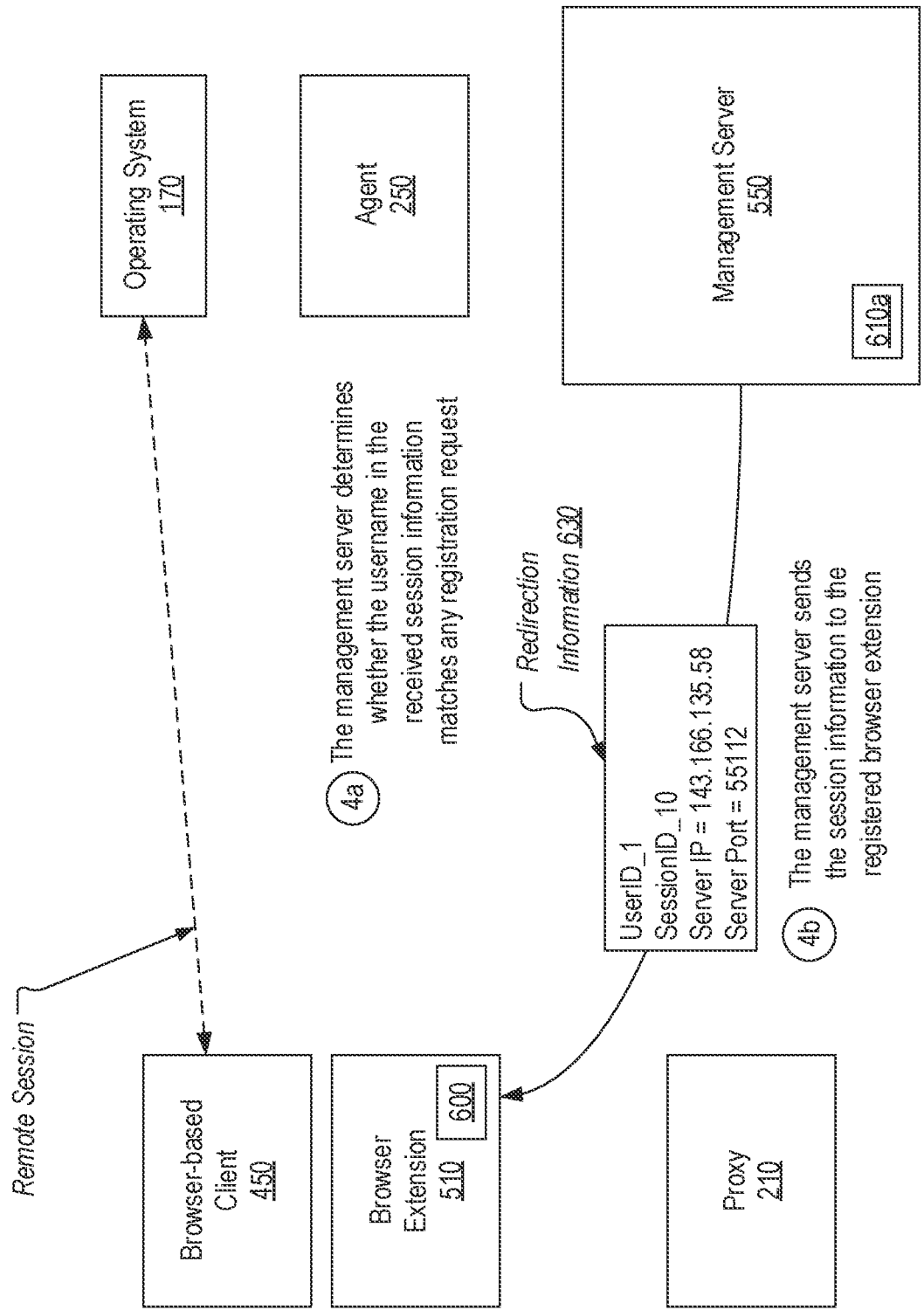

Turning to FIG. 6D, upon receiving session connect information 621, management server 550, in step 4*a*, can compare the username specified in the received session connect information 621 (UserID_1) to the username associated with the information stored from any registration request. In particular, at any given time, a number of browser extensions 510 on a number of clients 102 may be registered to receive state change notifications. Therefore, management server 550 can employ the username specified in the particular session connection information 621 to identify which, if any, browser extension has registered to be notified of state changes for the particular session. In this example, UserID_1 as specified in session connection information 621 will match UserID_1 as stored with information 610*a*, and therefore, management server 550 can determine that browser extension 510 executing on a client 102 having a hostname of hostname_1 and an IP address of 216.10.237.130 should be notified. Based on this determination, management server 550 can send redirection information 630 to browser extension 510. As shown, this redirection information 630 can include the session identifier assigned to the remote session that was established by browser-based remote desktop client 450, and the IP address and port number necessary for communicating with agent 250 via a virtual channel. Redirection information 630 is also shown as including UserID_1 although the username may be unnecessary given that browser extension 510 already knows it.

Figure 6E:
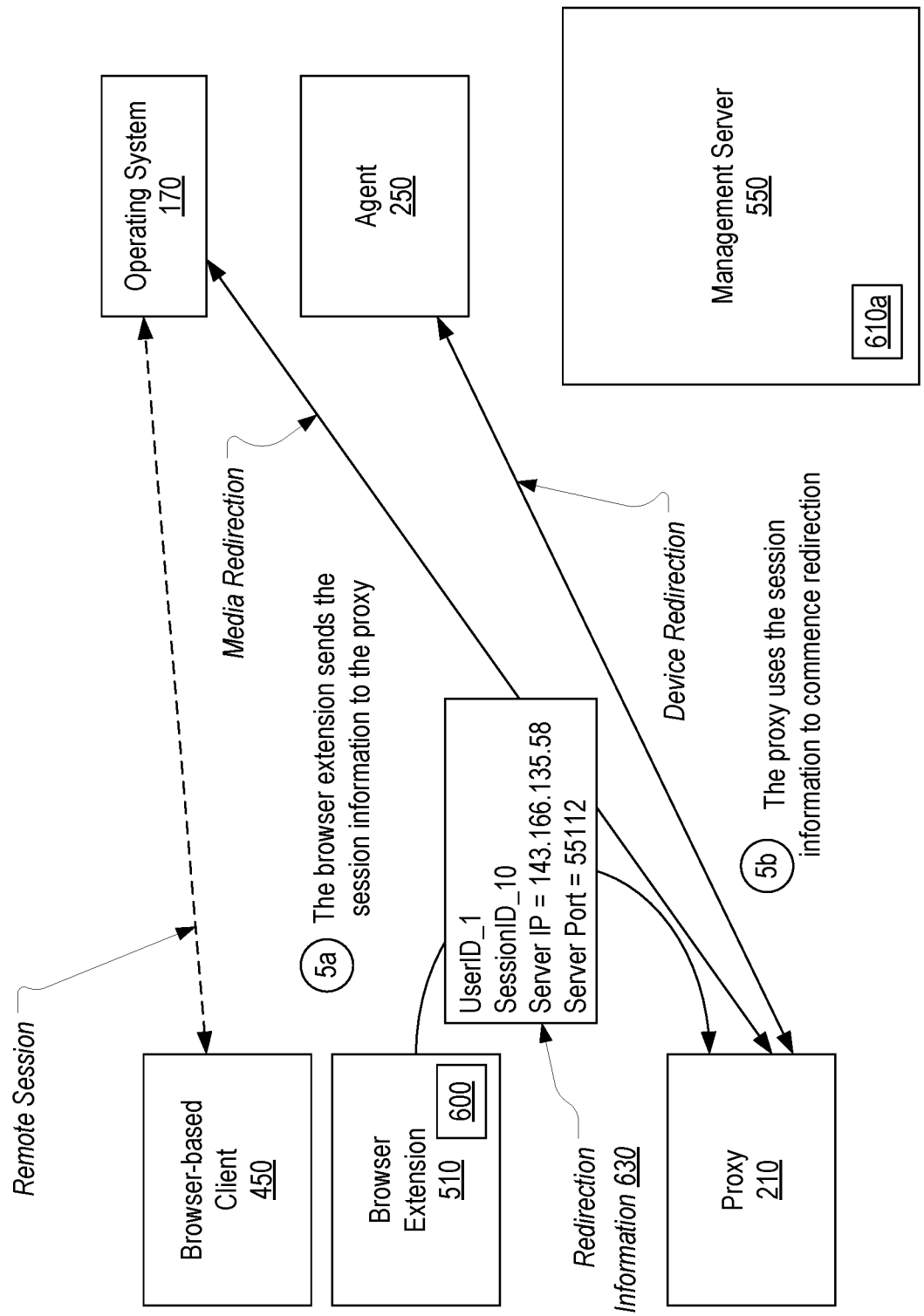

Turning to FIG. 6E, in step 5*a*, browser extension 510 routes redirection information 630 to proxy 210. If redirection information 630 as received from management server 550 does not include the username, browser extension 510 can include the username that it previously cached (in login details 600) in the redirection information 630 that it sends to proxy 210.

Given that browser extension 510 executes within browser 150 while proxy 210 is executed natively, traditional techniques for sharing information cannot be employed. Instead, proxy 210 can be configured to implement a web server so that browser extension 510 can send redirection information 630 via a browser-supported protocol such as HTTP. However, current browsers block requests that target a different domain (e.g., the localhost domain which will be proxy 210's domain) from the domain that served the current page (e.g., https://some_url). This is known as the same-origin policy. To get around this limitation, because the same-origin policy does not block image requests from different domains, browser extension 510 may employ the JavaScript Image class which allows an image to be requested from any domain, and proxy 210 can be configured to return the requested image.

To convey redirection information 630 as part of the image request, browser extension 510 can append a query string to the URL assigned to the source property of the image. For example, assuming proxy 210 is listening on port 60000, browser extension could set the source property of the image to:

http://localhost:60000/
   image.gif?username=UserID_1&sessionID=
   SessionID_10& IP=143.166.135.58&Port=55112

Accordingly, although browser extension 510 is requesting the image named image.gif (which proxy 210 can return to ensure that an error does not occur), browser extension 510 is also passing redirection information 630 to proxy 210.

Next, in step 5*b*, proxy 210 can use redirection information 630 to establish virtual channels for implementing device or media redirection. Notably, at this point, proxy 210, agent 250 and operating system 170 can implement redirection in a typical manner even though the remote session is being maintained by browser-based remote display client 450 within browser 150. In particular, the graphical display data and user input events will be sent between operating system 170 and browser-based remote desktop client 450 using the WebSocket protocol and via gateway 410, while device redirection communications will be sent directly between proxy 210 and agent 250 via virtual channels and media redirection communications will be sent between operating system 170 and proxy 210.

Figure 6F:
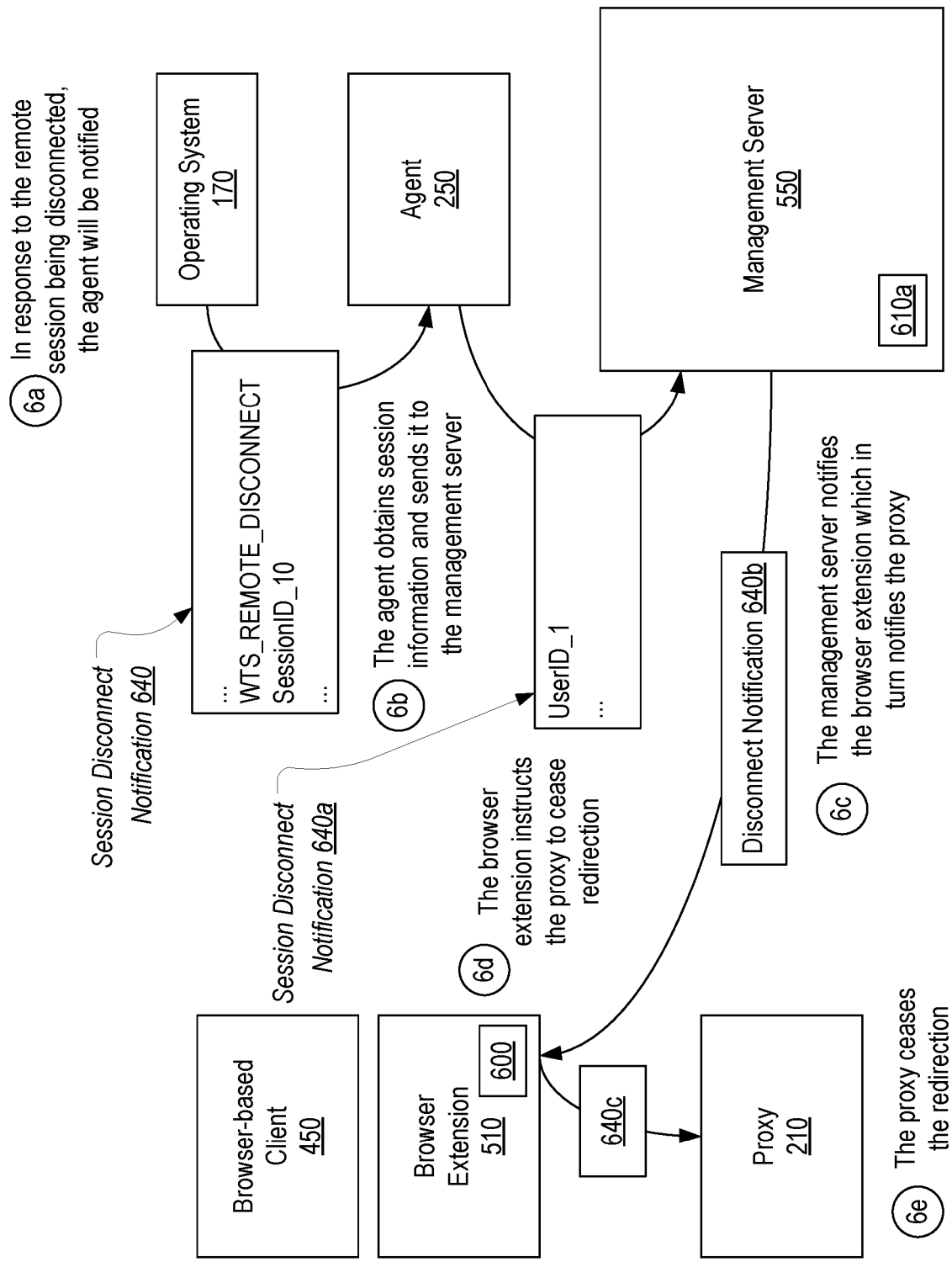

Finally, FIG. 6F represents the steps that are taken when the remote session is disconnected to ensure that any redirection is also terminated. In step 6*a*, it is assumed that browser-based remote desktop client 450's remote session has been disconnected, and therefore, operating system 170 will send agent 250 (or another agent) a session disconnect notification 640. As shown, session disconnect notification 640 may be in the form of a WM_WTSSESSION_CHANGE message that specifies WTS_REMOTE_DISCONNECT and the session identifier of the disconnected session (SessionID_10). In step 6*b*, agent 250 can employ the session identifier in session disconnect notification 640 to obtain the username (UserID_1) and then send a session disconnect notification 640a, which includes the username and possibly other information, to management server 550. In step 6c, management server 550 will employ the username specified in session disconnect notification 640a to identify the IP address and hostname for browser extension 410 (which is stored in information 610a) and use it to send a disconnect notification 640b to browser extension 510. In step 6d, browser extension 510 will send a disconnect notification 640c to proxy 210 (e.g., by again employing the URL in the source property of an image to specify a query string that includes an instruction to cease redirection (e.g., http://localhost:60000/image.gif?session disconnected)). In step 6e, proxy 210 will disconnect any virtual channels and cease redirection.

In summary, the functionality performed by browser extension 510 provides the natively executed proxy 210 with the information it needs to implement redirection in a remote session that a remote desktop client executing in a browser has established. Once proxy 210 receives this information, it can implement redirection in a traditional manner. As a result, the benefits of hosting the remote desktop client within the browser can be obtained without sacrificing redirection functionality.

Figure 7:
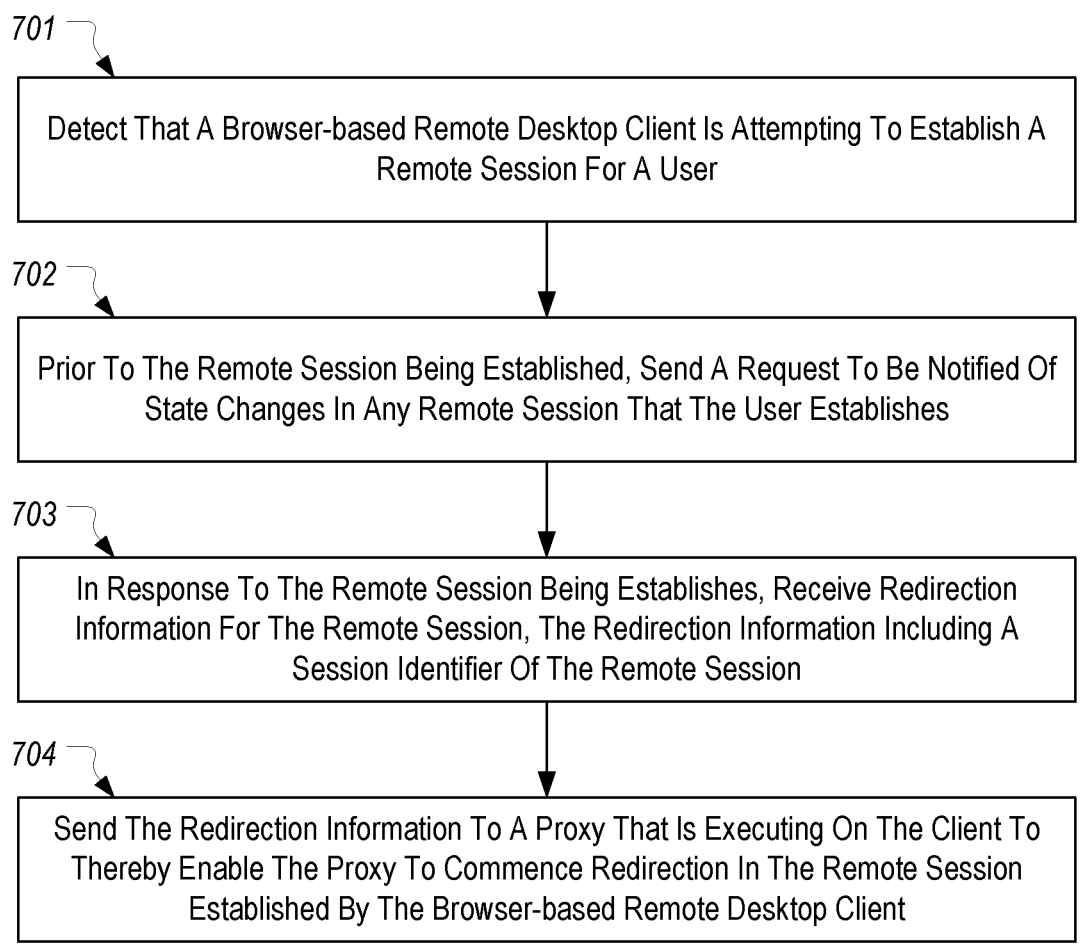
FIG. 7 provides a flowchart of an example method for implementing redirection when a browser-based remote desktop client establishes a remote session.

FIG. 7 provides a flowchart of an example method 700 for implementing redirection when a browser-based remote desktop client establishes a remote session. Method 700 can be implemented by browser extension 510 within VDI environment 500.

Method 700 includes an act 701 of detecting that a browser-based remote desktop client is attempting to establish a remote session for a user. For example, browser extension 510 can detect that a user has input login details into a login page of browser-based remote desktop client 450.

Method 700 includes an act 702 of, prior to the remote session being established, sending a request to be notified of state changes in any remote session that the user establishes. For example, browser extension 510 can send registration request 610 to management server 550.

Method 700 includes an act 703 of, in response to the remote session being establishes, receiving redirection information for the remote session, the redirection information including a session identifier of the remote session. For example, browser extension 510 can receive redirection information 630 from management server 550.

Method 700 includes an act 704 of sending the redirection information to a proxy that is executing on the client to thereby enable the proxy to commence redirection in the remote session established by the browser-based remote desktop client. For example, browser extension 510 can send redirection information 630 to proxy 210 to enable proxy 210 to establish one or more virtual channels within the remote session established by browser-based remote desktop client 450.

Embodiments of the present invention may comprise or utilize special purpose or general-purpose computers including computer hardware, such as, for example, one or more processors and system memory. Embodiments within the scope of the present invention also include physical and other computer-readable media for carrying or storing computer-executable instructions and/or data structures. Such computer-readable media can be any available media that can be accessed by a general purpose or special purpose computer system.

Computer-readable media is categorized into two disjoint categories: computer storage media and transmission media. Computer storage media (devices) include RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other similarly storage medium which can be used to store desired program code means in the form of computer-executable instructions or data structures and which can be accessed by a general purpose or special purpose computer. Transmission media include signals and carrier waves.

Computer-executable instructions comprise, for example, instructions and data which, when executed by a processor, cause a general purpose computer, special purpose computer, or special purpose processing device to perform a certain function or group of functions. The computer executable instructions may be, for example, binaries, intermediate format instructions such as assembly language or P-Code, or even source code.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like.

The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices. An example of a distributed system environment is a cloud of networked servers or server resources. Accordingly, the present invention can be hosted in a cloud environment.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description.

What is claimed:

1. A method for implementing redirection when a browser-based remote desktop client establishes a remote session, the method comprising:
   detecting, by a browser extension on a client, that a browser-based remote desktop client is attempting to establish a remote session for a user;
   prior to the remote session being established, sending, by the browser extension, a request to be notified of state changes in any remote session that the user establishes;
   in response to the remote session being established, receiving, by the browser extension, redirection information for the remote session, the redirection information including a session identifier of the remote session; and
   sending, by the browser extension, the redirection information to a proxy that is executing on the client to thereby enable the proxy to commence redirection in the remote session established by the browser-based remote desktop client.

2. The method of claim 1, wherein detecting that the browser-based remote desktop client is attempting to establish the remote session for the user comprises obtaining, from the browser-based remote desktop client, a username of the user that is to be used to establish the remote session.

3. The method of claim 2, wherein sending the request to be notified of state changes in any remote session that the user establishes comprises sending the username of the user and an IP address of the client to a management server.

4. The method of claim 1, further comprising:
delaying, by the browser extension, the attempt to establish the remote session for the user until after the request to be notified of state changes in any remote session that the user establishes has been successfully completed.

5. The method of claim 1, wherein the redirection information also includes an IP address and a port number of the server on which the remote session was established.

6. The method of claim 1, wherein sending the redirection information to the proxy comprises sending a browser-based request.

7. The method of claim 6, wherein the browser-based request is a request to retrieve an image from the proxy.

8. The method of claim 7, wherein the redirection information is sent to the proxy within a query string of a URL.

9. The method of claim 1, further comprising:
receiving, by the browser extension, a notification that the remote session has been disconnected; and
notifying the proxy to cease redirection.

10. The method of claim 9, wherein notifying the proxy comprises sending a browser-based request to the proxy.

11. One or more computer-storage media storing computer-executable instructions which when executed by one or more processors in a VDI environment perform a method for implementing redirection when a browser-based remote desktop client establishes a remote session, the method comprising:
detecting, by a browser extension on a client, that a user is attempting to establish a remote session on a server from a browser-based remote desktop client;
delaying, by the browser extension, the user's attempt until after the browser extension has registered to receive notifications of state changes in any remote session that the user establishes, wherein registering to receive notifications includes obtaining a username of the user from the browser-based remote desktop client and sending the username of the user to a management server;
receiving, by the browser extension and from the management server, a notification that a remote session has been established for the user, the notification including a session identifier of the remote session and an IP address of the server on which the remote session was established; and
sending, by the browser extension, the session identifier and the IP address of the server to a proxy that is executing on the client outside of the browser.

12. The computer storage media of claim 11, wherein the method further comprises:
employing, by the proxy, the session identifier and the IP address to commence redirection of a device or media within the remote session.

13. The computer storage media of claim 12, wherein employing the session identifier and the IP address to commence redirection comprises establishing one or more virtual channels.

14. The computer storage media of claim 11, wherein registering to receive notifications includes sending an IP address of the client to the management server.

15. The computer storage media of claim 14, wherein the method further comprises:
receiving, by a component on the server, a session change notification that indicates that the remote session has been established and that specifies the session identifier of the remote session;
employing, by the component on the server, the session identifier to retrieve the username of the user; and
sending, by the component on the server, the session identifier and the username of the user to the management server;
wherein the management server employs the username received from the component on the server to retrieve the IP address of the client and then uses the IP addresses of the client to send the notification to the browser extension.

16. The computer storage media of claim 11, wherein sending the session identifier and the IP address of the server to the proxy comprises sending the session identifier and the IP address of the server within a query string of a URL.

17. The computer storage media of claim 11, wherein registering to receive notifications comprises sending the username of the user, an identifier of the server and an IP address and hostname of the client to the management server.

18. The computer storage media of claim 11, wherein the method further comprises:
receiving, by the browser extension, a notification that the remote session has been disconnected; and
notifying the proxy to cease redirection.

19. A method for implementing redirection when a browser-based remote desktop client establishes a remote session, the method comprising:
detecting, by a browser extension on a client, that a browser-based remote desktop client is attempting to establish a remote session for a user on a server;
obtaining, from the browser-based remote desktop client, an identifier of the server and a username of the user;
prior to the remote session being established, sending, by the browser extension, a request to be notified of state changes in any remote session that the user establishes, the request to be notified including the identifier of the server, the username of the user and a client IP address at which the browser extension receives notifications;
receiving, by the browser extension, a notification that a remote session has been established for the user on the server, the notification including a session identifier of the remote session and a server IP address;
sending, by the browser extension, the session identifier and the server IP address to a proxy that is executing on the client outside of the browser; and
employing, by the proxy, the session identifier and the server IP address to commence redirection of one or more of a device or media within the remote session.

20. The method of claim 19, wherein the browser extension sends the request to be notified to a management server, the method further comprising:
receiving, by a component on the server, a session change notification that indicates that the remote session has been established and that specifies the session identifier of the remote session;
employing, by the component on the server, the session identifier to retrieve the username of the user; and
sending, by the component on the server, the session identifier and the username of the user to the management server;

wherein the management server employs the username received from the component on the server to retrieve the client IP address and then uses the client IP addresses to send the notification to the browser extension.

* * * * *